US010461819B2

(12) United States Patent
Chen et al.

(10) Patent No.: US 10,461,819 B2
(45) Date of Patent: Oct. 29, 2019

(54) MEDIA ACCESS CONTROL RANGE EXTENSION

(71) Applicant: Intel IP Corporation, Santa Clara, CA (US)

(72) Inventors: Cheng Chen, Hillsboro, OR (US); Carlos Cordeiro, Portland, OR (US); Claudio Da Silva, San Ramon, CA (US); Solomon Trainin, Haifa (IL); Alexander Maltsev, Nizhny Novgorod (RU); Artyom Lomayev, Nizhny Novgorod (RU)

(73) Assignee: Intel IP Corporation, Santa Clara, CA (US)

(*) Notice: Subject to any disclaimer, the term of this patent is extended or adjusted under 35 U.S.C. 154(b) by 0 days.

(21) Appl. No.: 15/474,979

(22) Filed: Mar. 30, 2017

(65) Prior Publication Data

US 2018/0131421 A1   May 10, 2018

Related U.S. Application Data

(60) Provisional application No. 62/417,719, filed on Nov. 4, 2016.

(51) Int. Cl.
  *H04B 7/0452* (2017.01)
  *H04B 7/06* (2006.01)
  *H04B 7/08* (2006.01)

(52) U.S. Cl.
  CPC ......... *H04B 7/0452* (2013.01); *H04B 7/0695* (2013.01); *H04B 7/088* (2013.01)

(58) Field of Classification Search
  CPC .. H04B 7/0452; H04B 7/0417; H04B 7/0491; H04B 7/088; H04B 7/0617; H04B 7/0695
  See application file for complete search history.

(56) References Cited

U.S. PATENT DOCUMENTS

| 8,422,961 B2* | 4/2013 | Kafle | H01Q 3/26 342/368 |
|---|---|---|---|
| 2014/0177543 A1* | 6/2014 | Cordeiro | H04B 7/0623 370/329 |
| 2015/0103756 A1* | 4/2015 | Sinha | H04B 7/0491 370/329 |
| 2015/0208439 A1* | 7/2015 | Cheong | H04B 7/0617 370/329 |

(Continued)

*Primary Examiner* — Edan Orgad
*Assistant Examiner* — Emmanuel K Maglo
(74) *Attorney, Agent, or Firm* — Eversheds Sutherland (US) LLP

(57) ABSTRACT

This disclosure describes methods, apparatus, and systems related to media access control (MAC) range extension. A device may cause to append a training field to each of one or more beacon frames. The device may cause to send the one or more beacon frames directionally using a sector sweep to one or more responder devices during a first interval. The device may determine an extended schedule element to be sent to the one or more responder devices, the extended schedule element including one or more directional antenna sectors to be used by the device during a second interval. The device may identify a first frame from a first responder device, during the second interval, wherein the first frame is received on a directional antenna sector of the one or more directional antenna sectors corresponding to an operating sector of the first responder device.

19 Claims, 7 Drawing Sheets

(56) References Cited

U.S. PATENT DOCUMENTS

| | | | |
|---|---|---|---|
| 2015/0289147 A1* | 10/2015 | Lou | H04B 7/0408 370/329 |
| 2016/0044711 A1* | 2/2016 | Lou | H04W 74/0816 370/338 |
| 2016/0066198 A1* | 3/2016 | Wang | H04W 16/28 370/338 |
| 2016/0174206 A1* | 6/2016 | Xia | H04B 7/0491 370/329 |
| 2017/0272959 A1* | 9/2017 | Tomisawa | H04B 7/0632 |
| 2017/0317726 A1* | 11/2017 | Abdallah | H04B 7/0452 |
| 2017/0353984 A1* | 12/2017 | Abdallah | H04B 7/0617 |

* cited by examiner

MEDIA ACCESS CONTROL RANGE EXTENSION

CROSS-REFERENCE TO RELATED APPLICATIONS

This application claims the benefit of U.S. Provisional Application 62/417,719, filed on Nov. 4, 2016, the disclosure of which is incorporated herein by reference as if set forth in full.

TECHNICAL FIELD

This disclosure generally relates to systems and methods for wireless communications and, more particularly, to media access control (MAC) range extension.

BACKGROUND

Wireless devices are becoming widely prevalent and are increasingly requesting access to wireless channels. A wireless communication network in a millimeter-wave band may provide high-speed data access for users of wireless communication devices.

DETAILED DESCRIPTION

Figure 1:
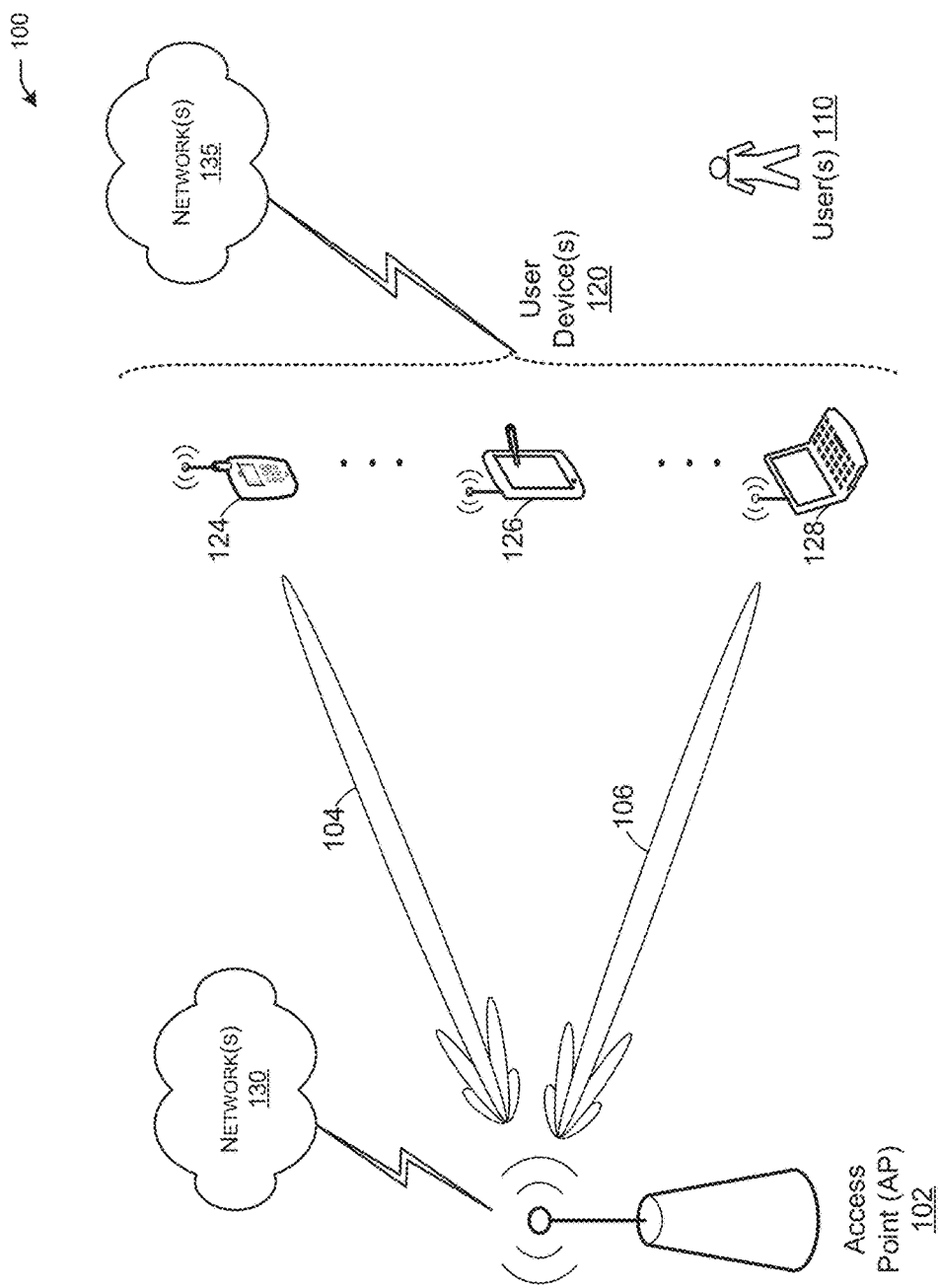
FIG. 1 depicts a network diagram illustrating an example network environment of an illustrative MAC range extension system, according to one or more example embodiments of the disclosure.

Example embodiments described herein provide certain systems, methods, and devices, for MAC range extension.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

During communication between two devices, one or more frames may be sent and received. These frames may include one or more fields (or symbols) that may be based on IEEE 802.11 specifications, including, but not limited to, an IEEE 802.11ad specification, or IEEE 802.11ay specification. Devices may operate in multiuser multiple-input and multiple-output (MU-MIMO) technology. It is understood that MIMO facilitates multiplying the capacity of a radio link using multiple transmit and receive antennas to exploit multipath propagation. MIMO provides a practical technique for sending and receiving more than one data signal on the same radio channel at the same time via multipath propagation. MU-MIMO provides a means for wireless devices to communicate with each other using multiple antennas such that the wireless devices may transmit at the same time and frequency and still be separated by their spatial signatures. For example, using MU-MIMO technology and AP may be able to communicate with multiple devices using multiple antennas at the same time to send and receive data. An AP operating in MU-MIMO and in a 60 GHz frequency band may utilize a MU-MIMO frame to communicate with devices serviced by that AP.

Task Group ay (TGay) is currently developing an amendment that will define modifications to the IEEE 802.11 PHY and MAC to enable stations (STAs) operating in bands above 45 GHz a maximum throughput of at least 20 gigabits per second (Gbps). Sector level sweep (SLS) procedures enable a device to find the optimal antenna configuration with its recipient by first using all sectors and determining the optimal sector. However, this is limited to STAs that are in proximity to the personal basic service set (PBSS) control point/access point (AP/PCP). In current IEEE 802.11ad SLS, an AP/PCP and a STA perform antenna training, with the receiver's antenna pattern configured to quasi-omni mode. A quasi-omni mode implements a TX-RX space scanning in all directions, which radiates radio wave power uniformly in all directions. This type of mode may be limited in range since the radio wave power is spread out in all directions. Since AP/PCP may have large array(s) and transmission power, a distant STA might be able to detect the directional multi-gigabit (DMG) beacon frame sent in directional mode from AP/PCP. However, if the STA is equipped with a much smaller array resulting in less power, it may not be able to send a response that will be detected by the AP/PCP in quasi-omni mode. That is, the AP/PCP is capable of communicating directionally to, a distant STA that is listening in quasi-omni mode, while the STA may be incapable of communicating directionally to the AP/PCP that may be listening in quasi-omni mode. In addition, distant STAs, which managed to associate to the AP/PCP, will still have problems with channel access in DTI since STAs (including AP/PCP) typically use quasi-omni mode for receiving. A typical beacon interval may consist of a beacon header interval and a data transmission interval (DTI). The beacon header interval may consist of up to three subintervals. First, the Beacon Transmission Interval (BTI), which may include multiple beacon frames, each transmitted by the AP/PCP on a different sector to cover all possible directions. That is, during BTI, the AP/PCP performs a transmit sector sweep (TXSS) procedure transmitting DMG beacon frames through all available antenna sectors, while the responder device's antenna is configured to a quasi-omni pattern. Second, the Association Beamforming Training (A-BFT) is used by stations to train their antenna sector for communication with the AP/PCP. Third, during the Announcement Transmission Interval (ATI), the AP/PCP exchanges management information with associated and beam-trained STAs. The DTI comprises of one or more contention-based access periods (CBAPs) and scheduled service periods (SPs) where stations exchange data frames.

While in CBAP multiple stations can contend for the channel according to the IEEE 802.11 enhanced distributed coordination function (EDCF), an SP is assigned for communication between a dedicated pair of STAs as a contention free period.

Example embodiments of the present disclosure relate to systems, methods, and devices for MAC range extension.

In some demonstrative embodiments, one or more devices may be configured to communicate a SU or MU-MIMO frame, for example, over a 60 GHz frequency band. The one or more devices may be configured to communicate in a mixed environment such that one or more legacy devices are able to communicate with one or more non-legacy devices. That is, devices following one or more IEEE 802.11 specifications may communicate with each other regardless of which IEEE 802.11 specification is followed.

A directional multi-gigabit (DMG) communications may involve one or more directional links to communicate at a rate of multiple gigabits per second, for example, at least 1 Gigabit per second, e.g., 7 Gigabit per second, or any other rate. An amendment to a DMG operation in a 60 GHz band, e.g., according to an IEEE 802.11ad standard, may be defined, for example, by an IEEE 802.11ay project.

In some demonstrative embodiments, one or more devices may be configured to communicate over a next generation 60 GHz (NG60) network, an extended DMG (EDMG) network, and/or any other network. For example, the one or more devices may be configured to communicate over the NG60 or EDMG networks.

In some demonstrative embodiments, one or more devices may be configured to support the one or more mechanisms and/or features in a backwards compatible manner, for example, in a manner which may be compatible with one or more devices ("legacy devices"), which may not support these mechanisms and/or features, for example, one or more non-EDMG devices, (e.g., devices configured according to an IEEE 802.11ad standard), and the like. In one example, a legacy device, for example, a DMG device, may include, may comply with, and/or may be configured according to, a first specification, for example, an IEEE 802.11ad specification, while a non-legacy device, for example, an EDMG device, may include, may comply with, and/or may be configured according to, a second specification, for example, an IEEE 802.11ay specification.

In one embodiment, a MAC range extension system may include an AP/PCP that may perform a sector level sweep during a BTI interval. The sector level sweep may include transmissions from the AP/PCP in multiple directions. The sector level sweep transmissions may include DMG beacon frames transmitted in multiple directions.

In one embodiment, a MAC range extension system may facilitate appending training fields (e.g., TRN-R) to the DMG beacon frames in the sector sweep. These DMG beacon frames may be used to train one or more responder STAs to determine the best sector that the AP/PCP would be listening to in order to receive packets and/or frames from at least one responder STA. Each DMG beacon frame may be associated with a sector that represents an angled space during a transmission. Based on the sector, a DMG beacon frame may be transmitted in a particular direction associated with that sector. In a sector level sweep, DMG beacon frames may be transmitted in every available direction corresponding to the sectors available at the AP.

The AP/PCP may transmit DMG beacon frames over different antenna sectors. The STAs may listen for the sector sweep (SSW) or short SSW frames in quasi-omni mode. In this way, the best TX sector of the AP/PCP 202 may be determined. Due to antenna reciprocity, the best RX sector for AP/PCP 202 may also be determined. On the other hand, the AP/PCP 202 may append training fields (TRN-R) at the end of each beacon frame, and for each training field, an STA may sweep its receiving antenna sectors to determine its best RX sector, then due to antenna reciprocity, STAs also determine their best TX sectors. Antenna reciprocity means that a best transmit sector is also the best receiving sector. If a transceiver has TX-RX sector alignment, discovering the best RX sector for the transceiver may mean finding the best TX sector (applicable for both APs and STAs) and selecting the corresponding RX sector. For example, when an STA determines the TX sector of the AP/PCP, the STA also determines the best receiving sector of the AP/PCP (e.g., using quasi omni mode reception of SSW frames).

In one embodiment, a MAC range extension system may facilitate scheduling allocation of resources (e.g., timeslots, bandwidth, frequency, channel, etc.) through the EDMG extended schedule element to present an enhanced SLS beamforming (BF) flow. An EDMG extended schedule element is an element entry in a beacon or an announce frame showing a schedule for a beacon interval. There may be one or more extended schedule element entries conveyed within a beacon or an announce frame.

In one embodiment, the MAC range extension system may modify the EDMG extended schedule element to include one or more fields to indicate on which sector the AP/PCP will be listening during each allocation. The allocation may be either contention-based access period (CBAP) or scheduled service period (SP). An STA may use this information to decide to respond to the AP/PCP in the specific directional allocation, which corresponds to the sector identified in the BTI. The AP/PCP may configure its RX antenna to a directional mode during DTI and may use the information exchanged in the EDMG extended schedule element to determine the RX sector that the responder STA will be communicating with.

In one embodiment, the MAC range extension system may facilitate polling of responder STAs as an alternative to using the EDMG extended schedule element. In this case, the AP/PCP may send a polling request asking each responder STA to send its best, or otherwise operating TX-RX sector such that the AP is able to listen on that TX-RX sector during DTI. A responder STA may send a probe response to include the responder STA's operating TX-RX sector. This mechanism may be performed in CBAP or SP in DTI.

The main advantage of the MAC range extension system is that it provides an efficient mechanism from the MAC perspective to resolve the asymmetric link problem, without the need to modify the current A-BFT procedures. For example, an advantage may be that the MAC range extension system solves the asymmetric link problem and avoids the use of quasi-omni receiving at AP/PCP. Further, the MAC range extension system may provide better integration with current A-BFT, with minimal changes and less complexity. Furthermore, the MAC range extension system may facilitate the reuse of existing channel access.

The above descriptions are for purposes of illustration and are not meant to be limiting. Numerous other examples, configurations, processes, etc., may exist, some of which are described in detail below. Example embodiments will now be described with reference to the accompanying figures.

FIG. 1 is a network diagram illustrating an example network environment, according to some example embodiments of the present disclosure. Wireless network 100 may include one or more user device(s) 120 and one or more access point(s) (AP) 102, which may communicate in accordance with IEEE 802.11 communication standards, such as, IEEE 802.11ad and/or IEEE 802.11ay specifications. The user device(s) 120 may be mobile devices that are non-stationary and do not have fixed locations.

Figure 5:
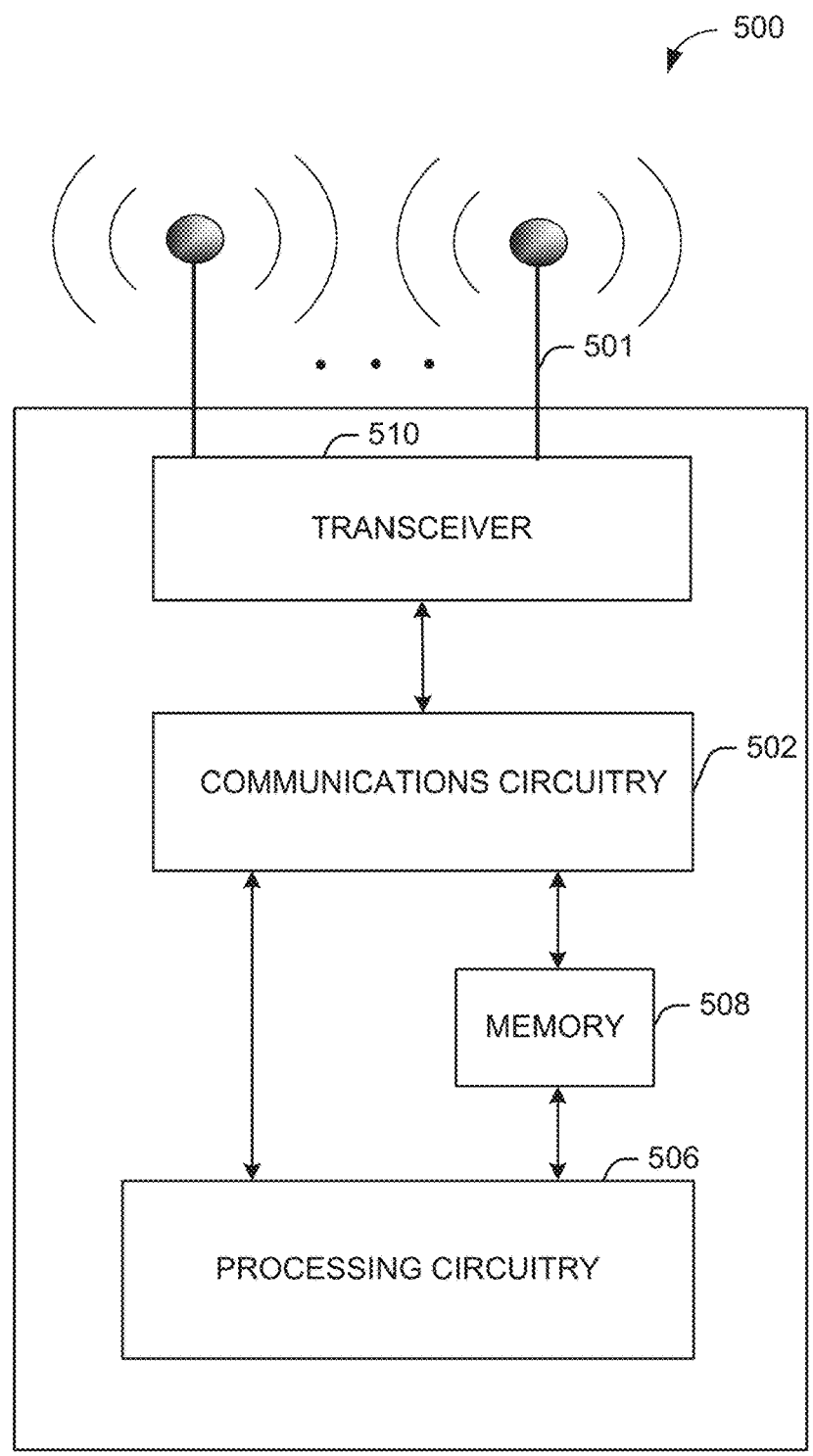
FIG. 5 illustrates a functional diagram of an example communication station that may be suitable for use as a user device, in accordance with one or more example embodiments of the disclosure.
Figure 6:
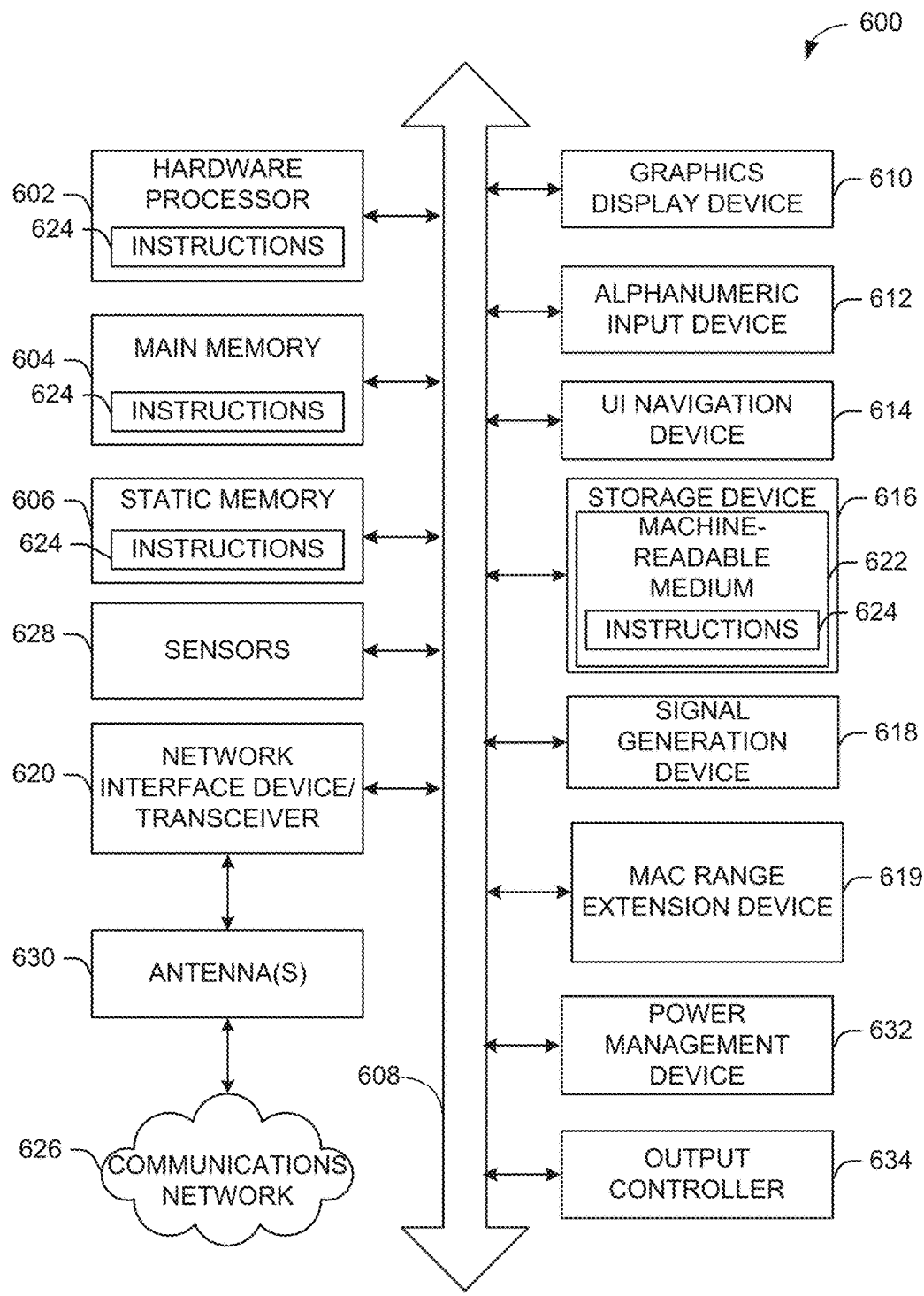
FIG. 6 is a block diagram of an example machine upon which any of one or more techniques (e.g., methods) may be performed, in accordance with one or more embodiments of the disclosure.

In some embodiments, the user device(s) 120 and AP 102 may include one or more computer systems similar to that of the functional diagram of FIG. 5 and/or the example machine/system of FIG. 6.

One or more illustrative user device(s) 120 and/or AP 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP 102 may operate as a personal basic service set (PBSS) control point/access point (AP/PCP). The user device(s) 120 (e.g., 124, 126, or 128) and/or AP 102 may include any suitable processor-driven device including, but not limited to, a mobile device or a non-mobile, e.g., a static, device. For example, user device(s) 120 and/or AP 102 may include, for example, a DMG device, an EDMG device, a UE, an MD, a station (STA), an access point (AP), a personal computer (PC), a wearable wireless device (e.g., bracelet, watch, glasses, ring, etc.), a desktop computer, a mobile computer, a laptop computer, an ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like.

Any of the user device(s) 120 (e.g., user devices 124, 126, 128), and AP 102 may be configured to communicate with each other via one or more communications networks 130 and/or 135 wirelessly or wired. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128), and AP 102 may include one or more communications antennae. Communications antenna may be any suitable type of antenna corresponding to the communications protocols used by the user device(s) 120 (e.g., user devices 124, 124 and 128), and AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the user device(s) 120.

Any of the user device(s) 120 (e.g., user devices 124, 126, 128), and/or AP 102 may include any suitable radio and/or transceiver for transmitting and/or receiving radio frequency (RF) signals in the bandwidth and/or channels corresponding to the communications protocols utilized by any of the user device(s) 120 and/or AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, a frequency band according to the WGA specification, and the like.

The phrases "directional multi-gigabit (DMG)" and "directional band" (DBand), as used herein, may relate to a frequency band wherein the channel starting frequency is above 45 GHz. In one example, DMG communications may involve one or more directional links to communicate at a rate of multiple gigabits per second, for example, at least 1 Gigabit per second, e.g., 7 Gigabit per second, or any other rate.

In some demonstrative embodiments, user device(s) 120 and/or AP 102 may be configured to operate in accordance with one or more specifications, for example, including, one or more IEEE 802.11 specifications, e.g., an IEEE 802.11ad specification, an IEEE 802.11ay specification, and/or any other specification and/or protocol. For example, an amendment to a DMG operation in the 60 GHz band, e.g., according to an IEEE 802.11ad Standard, may be defined, for example, by an IEEE 802.11ay project.

Some communications over a wireless communication band, for example, a DMG band may be performed over a single channel bandwidth (BW). For example, The IEEE 802.11ad specification defines a 60 GHz system with a single channel bandwidth (BW) of 2.16 GHz, which is to be used by all Stations (STAs) for both transmission and reception.

In some demonstrative embodiments, user device(s) 120 and/or AP 102 may be configured to implement one or more mechanisms, which may, for example, enable to extend a single-channel BW scheme, e.g., according to the IEEE 802.11ad specification, for higher data rates and/or increased capabilities.

Some specifications, e.g., an IEEE 802.11ad specification, may be configured to support a single user (SU) system, in which an STA cannot transmit frames to more than a single STA at a time. Such specifications may not be able, for example, to support an STA transmitting to multiple STAs simultaneously, for example, using a multi-user MIMO (MU-MIMO) scheme, e.g., a downlink (DL) MU-MIMO, or any other MU scheme.

In some demonstrative embodiments, user device(s) 120 and/or AP 102 may be configured to implement one or more Multi-User (MU) mechanisms. For example, user device(s) 120 and/or AP 102 may be configured to implement one or more MU mechanisms, which may be configured to enable MU communication of Downlink (DL) frames using a Multiple-Input-Multiple-Output (MIMO) scheme, for example, between a device, e.g., AP 102, and a plurality of user devices, e.g., including user device(s) 120 and/or one or more other devices.

In some demonstrative embodiments, user device(s) 120 and/or AP 102 may be configured to communicate over a Next Generation 60 GHz (NG60) network, an Extended DMG (EDMG) network, and/or any other network. For example, user device(s) 120 and/or AP 102 may be configured to communicate MIMO, e.g., DL MU-MIMO, transmissions and/or use channel bonding, for example, for communicating over the NG60 and/or EDMG networks.

In some demonstrative embodiments, user device(s) 120 and/or AP 102 may be configured to support one or more mechanisms and/or features, for example, channel bonding, single user (SU) MIMO, and/or and multi user (MU) MIMO, for example, in accordance with an EDMG Standard, an IEEE 802.11ay standard and/or any other standard and/or protocol.

In one embodiment, and with reference to FIG. 1, an initiator (e.g., AP 102) may be configured to communicate using SU and/or MU MIMO technique, for example, over a 60 GHz frequency band with one or more responders (e.g., non-AP STAs, such as, user devices 120).

For example, in order for the AP 102 to establish a MU-MIMO communication with two devices (e.g., user device 124 and user device 128), the AP 102 may need to perform beamforming training with the user device 124 and the user device 128. Additionally, user device 126 may not be part of the MU-MIMO communication. The AP 102 may transmit one or more SSW frames over different antenna sectors defined by the one providing high signal quality between the AP 102 and the user device 124 and the user device 128. However, the SSW frames may reach the user device 126. When the user device 126 receives the SSW frames, the user device 126 may need to be aware that it is not part of the MU-MIMO communication. It is understood that the above descriptions are for purposes of illustration and are not meant to be limiting.

Figure 2:
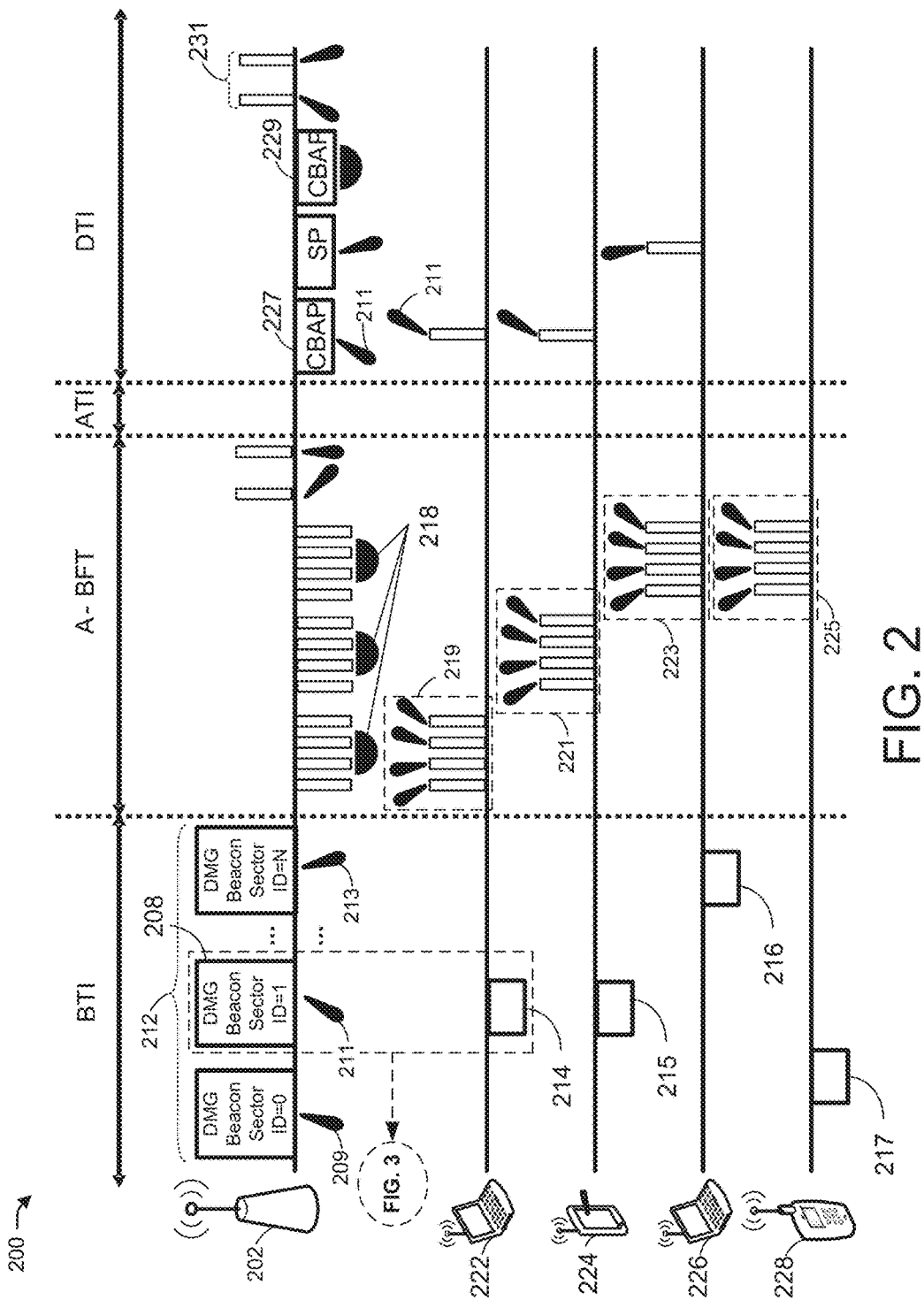
FIG. 2 depicts an illustrative schematic diagram of a MAC range extension system, in accordance with one or more example embodiments of the present disclosure.

FIG. 2 depicts an illustrative schematic diagram of a MAC range expansion system, in accordance with one or more example embodiments of the present disclosure.

Referring to FIG. 2, there is shown BTI, A-BFT, ATI, and DTI intervals, which may be intervals for beamforming training between AP/PCP 202 and one or more responder STA (e.g., responder STAs 222, 224, 226, and 228). In the BTI interval, the AP/PCP 202 as an initiator device may perform an initiator transmit sector sweep (I-TXSS) by sending one or more directional beacon frames (e.g., DMG beacons 212) each sent using a direction (e.g., directions 209, 211, and 213, etc.). These directions may be associated with various sector IDs (e.g., ID=0, 1, . . . , N, where N is an integer). For example DMG beacon 208 may use sector ID=1, which may be received by the responder STAs.

In this example, responder STAs 222, 224, 226, and 228, are shown to be receiving these DMG beacon frames. These responder STAs are assumed to be distant responder STAs. For example, beacons 214, 215, 216, and 217 may be received by responder STA 222, 224, 226, and 228, respectively. Further, in this example, responder STAs 222, 224, and 226 are EDMG responder STAs and responder STA 228 is a legacy or a DMG responder STA.

The distant EDMG STAs, which managed to associate to the AP/PCP 202 through the enhanced SLS beamforming training during BTI, will have problems with channel access in the DTI since STAs (including AP/PCP) typically use quasi-omni mode for receiving. Further, some distant EDMG STAs may not be able to associate with the AP/PCP in A-BFT either.

In one embodiment, a MAC range expansion system may facilitate the responder and the initiator device the capability to receive frames in a directional mode in addition to a quasi-omni mode based on utilizing an enhancement to the beacon frames used in a sector sweep (e.g., I-TXSS). The enhancement may include appending a training field to each of the beacon frames.

Figure 3:
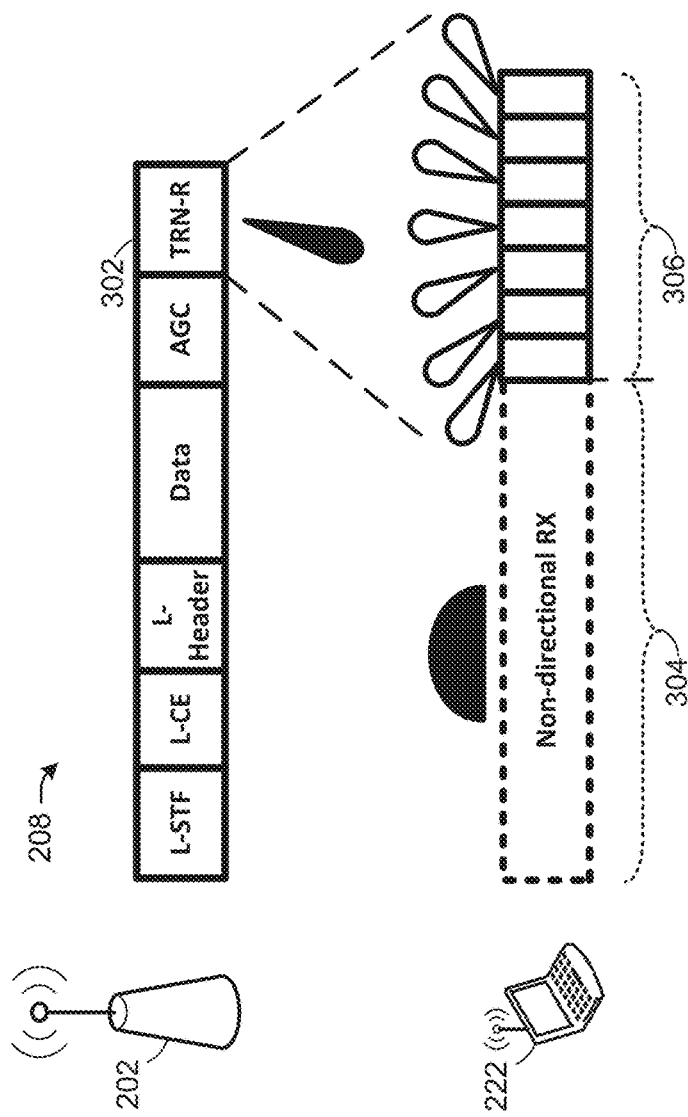
FIG. 3 depicts an illustrative schematic diagram of a MAC range extension system, in accordance with one or more example embodiments of the present disclosure.

In one embodiment, a MAC range expansion system may append a training field (e.g., TRN-R) to one of the one or more directional beacon frames (e.g., DMG beacons 212), which may be described in detail in FIG. 3.

Sector sweep frames transmitted during the regular SLS process allow the AP/PCP to determine its best TX sector, and then due to antenna reciprocity, it knows its best RX sector. The TRN-R fields appended at the end of the beacon frame enable the responder STAs to determine the best RX sectors for the STAs. Then, assuming antenna reciprocity, STAs will also know their best TX sectors. The AP/PCP determines its best TX sector to each STA using the DMG beacon frames transmitted in the I-TXSS process where the PCP/AP sweeps its antenna sectors and send a DMG Beacon frame in each sector direction.

For example, the responder STA 222 may have received the sector sweep of directional beacon frames. The responder STA 222 may determine that a DMG beacon 214 is received on its best RX sector. The responder STA 222 may have received the DMG beacon 214 from the AP/PCP 202 in the direction 211. The direction 211 may be determined by the responder STA 222 that it is the best TX sector for the reception of the DMG beacon frame 214. Based on the training using the TRN-R field, the responder STA 222 may also determine that direction 211 is the best RX sector on the STA 222. A best RX sector is determined by comparing the transmission and reception paths between the AP/PCP 202 and the responder STA 222. A best RX sector of the responder STA 222 may be selected based on the comparison. The best RX sector may be used as the operational sector such that the responder STA 222 may later use that operational sector in the direction 211 when transmitting other frames to the AP/PCP.

The AP/PCP 202 may repeat the sector sweep in the same order as in the BTI but in the RX mode during the DTI. Each responder STA may transmit one frame in the AP/PCP 202 sector detected as the best one during the I-TXSS in the BTI. The responder STA's transmission during DTI may be performed in directional mode using the operating sector trained during BTI. In this case, some level of TX-RX EDMG STA reciprocity is assumed. It should be understood that antenna reciprocity means that a best transmit sector may be assumed to be the best receiving sector. For example, during BTI, the responder STA 222 may have determined that direction 211 is its best RX sector and due to antenna reciprocity, the responder STA 222 may have determined that the direction 211 is also its best TX sector. During DTI, the responder STA 222 may transmit one or more frames (e.g., SSW, short SSW, etc.) in the direction 211. In some example embodiments, the responder STA 222 may inform the AP/PCP 202 of that determination. In turn, the AP/PCP 202 may listen in the direction 211 during DTI.

In one embodiment, a MAC range expansion system may modify the (EDMG) extended schedule element by adding a field to indicate the RX sector associated with a responder STA that the AP/PCP will use when listening and waiting for transmissions from the responder STA. This information will assist the AP/PCP to determine which direction it will be listening through each allocation during DTI. The allocation may be either contention-based access period (CBAP) or scheduled service period (SP).

In one embodiment, a MAC range expansion system may facilitate an AP/PCP (e.g., AP/PCP 202) to use the allocation using an EDMG extended schedule element to listen during DTI. For example, an AP/PCP 202 may specify the RX sector that it will use to listen during the allocation for each allocation in the EDMG extended schedule element. This may be considered as a directional allocation. The AP/PCP 202 may still schedule allocations in which it uses quasi-omni reception (e.g., to receive from legacy devices). Any type of transaction may take place in the allocation, including beamforming and data transmissions.

In one embodiment, a responder STA (e.g., responder STA 222) can use the information in the EDMG extended schedule element to decide to respond to the AP/PCP in the specific directional allocation, which corresponds to the sector identified in the BTI. The responder STA can always attempt to use the A-BFT to perform beamforming. The STA can use the directional allocations in addition to non-directional allocations to perform any transaction.

In one embodiment, the MAC range expansion system may use the enhanced EDMG extended schedule element to schedule allocations in DTI. Although with the enhanced EDMG extended schedule element, the AP/PCP is capable of directional allocation of CBAP and SP, the AP/PCP may still schedule allocations in which it uses quasi-omni reception (e.g., to receive from legacy devices).

In one embodiment, the MAC range expansion system may keep the legacy procedures unchanged in A-BFT. That is, the AP/PCP 202 may receive in quasi-omni mode 218. The responder STAs 222, 224, 226, and 228 may perform a responder transmit sector sweep (R-TXSS) by sweeping their RX sectors and send responses (e.g., responses 219, 221, 223, and 225) to the AP/PCP.

In the DTI, an EDMG responder STA may decide to access the directional allocation (CBAP or SP) with the RX sector of AP/PCP corresponding to the sector identified in the BTI interval and may transmit one SSW (or a short SSW) frame in this sector. For example, the responder STA 222 may send an SSW frame in direction 211, which had been determined during BTI to be the direction of the operating sector. The responder STA 222 may use the CBAP 227, which may have a direction 211 allocated by the AP/PCP 202, which was based on the determination during the BTI interval.

It can also attempt to use any other non-directional (e.g., quasi-omni mode) CBAP (e.g., CBAP 229) or SP.

Then, the AP/PCP may respond with a SSW-feedback 231 in return to confirm the receipt of the SSW frame. If no SSW-Feedback is received in response, a STA may contend again for the channel to attempt to retransmit the SSW.

In another embodiment, besides using scheduling through the (EDMG) extended schedule element, an alternative approach may be to allow the AP/PCP 202 to use polling in CBAPs/SPs in the DTI. The AP/PCP may poll the STAs one by one and perform transactions like beamforming or data transmissions. It is understood that the above descriptions are for purposes of illustration and are not meant to be limiting.

FIG. 3 depicts an illustrative schematic diagram of a MAC range extension system, in accordance with one or more example embodiments of the present disclosure.

Referring to FIG. 3, there is shown the AP/PCP 202 of FIG. 2, as an initiator device, that may perform a transmit and initiator sector sweep (I-TXSS) during the BTI interval by sending one or more directional beacon frames (e.g., DMG beacon 208) to one or more responder STAs (e.g., responder STA 222).

In one embodiment, the MAC range extension system may define a directional beacon frame (e.g., DMG beacon 208) to append a training (TRN-R) field 302 to one or more fields of the directional beacon frame. For example, the DMG beacon 208 may include, at least in part, a legacy short training field (L-STF), a legacy channel estimation (L-CE), a legacy header (L-Header), a data field, an automatic gain control (AGC), and an appended training (TRN-R) field 302.

In one embodiment, the MAC range extension system may facilitate that a responder device (e.g., the responder STA 222) may receive in at least one of a quasi-omni mode or a directional mode in the BTI interval. For example, the responder STA 222 may be able to receive in non-directional receive mode 304 and/or a directional mode 306. In the directional mode 306, the responder device (e.g., the responder STA 222) may need to listen directionally for signals coming from the initiator device (e.g., the AP/PCP 202).

The TRN-R field 302 may facilitate the training of a responder's receive (RX) sectors. As shown in FIG. 3, a TRN-R field 302 is appended to the beacon frame 208 to allow the training of the responder STA 222 RX sectors. This may allow the responder STA 222 to discover the best RX sector. The TRN-R field 302 may include one or more training sequences that that may help the responder STA 222 to identify an operating sector (e.g. best RX sector) to be used when transmitting in later intervals to the AP/PCP 202 in a particular direction.

In one embodiment, the AP/PCP may transmit DMG beacon frames over different antenna sectors. The STAs may listen for the SSW frames in quasi-omni mode. In this way, the best TX sector of the AP/PCP 202 may be determined. Due to antenna reciprocity, the best RX sector for AP/PCP 202 may also be determined. On the other hand, the AP/PCP 202 may append training fields (TRN-R) at the end of each beacon frame, and for each training field, an STA may sweep its receiving antenna sectors to determine its best RX sector, then due to antenna reciprocity, STAs also determine their best TX sectors.

The responder STA 222 may determine, its own best RX sector, which may be aligned with the best TX sector of the AP/PCP 202. The same is true for the best TX sector of the responder STA 222 being aligned with the best RX sector of the AP/PCP 202 because of the antenna reciprocity presumption. Antenna reciprocity means that a best transmit sector is also the best receiving sector. If a transceiver has TX-RX sector alignment, discovering the best RX sector for the transceiver may mean finding the best TX sector (applicable for both APs and STAs) and selecting the corresponding RX sector. It is understood that the above descriptions are for purposes of illustration and are not meant to be limiting.

Figure 4A:
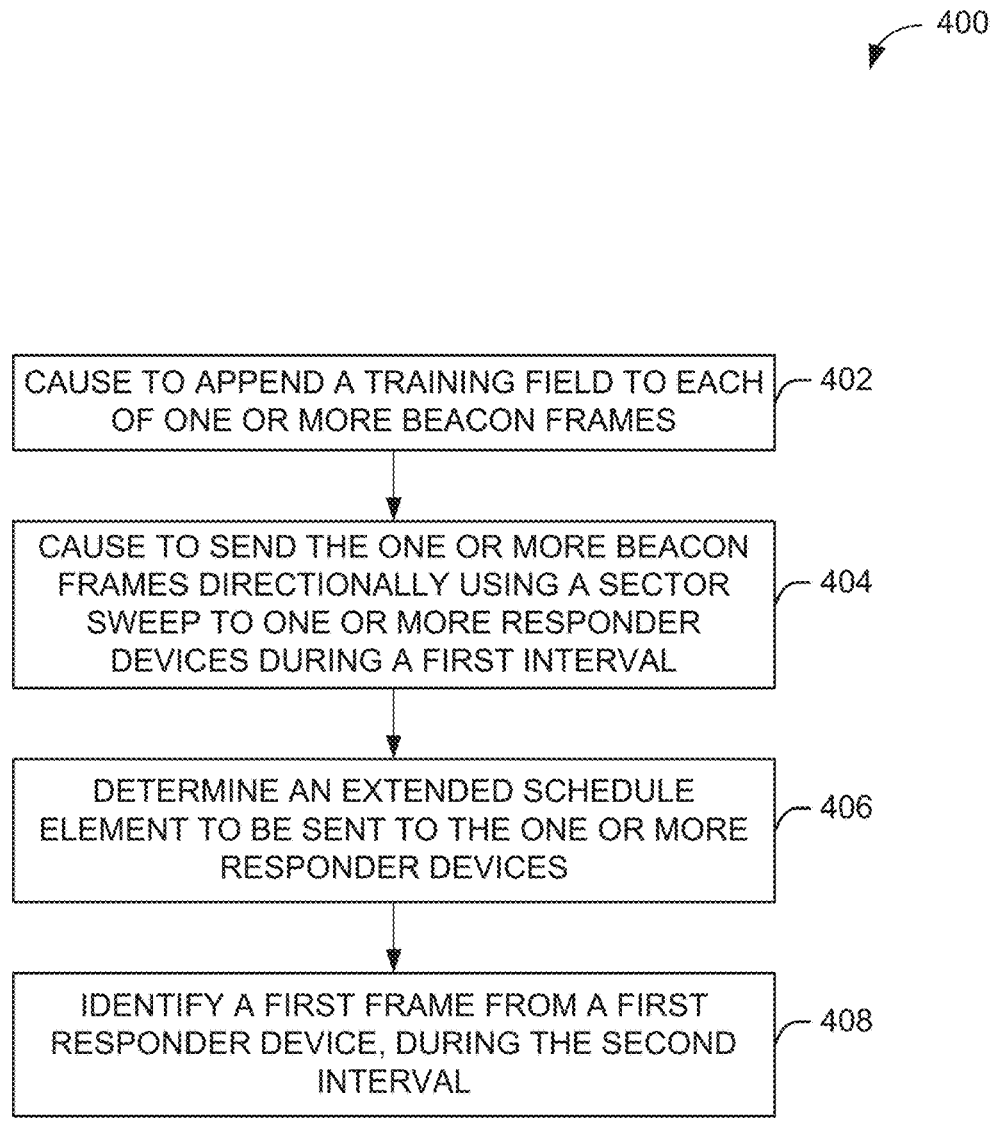
FIG. 4A depicts a flow diagram of an illustrative process for an illustrative MAC range extension system, in accordance with one or more embodiments of the disclosure.

FIG. 4A illustrates a flow diagram of illustrative process 400 for a MAC range extension system, in accordance with one or more example embodiments of the present disclosure.

At block 402, an initiator device (e.g., the AP 102 of FIG. 1) may cause to append a training field to each of one or more beacon frames. For example, the AP 102 may append training fields (e.g., TRN-R) to the DMG beacon frames in the sector sweep during the BTI interval. These DMG beacon frames may be used to train one or more responder STAs to determine its best RX sector that the AP 102 would be listening in DTI in order to receive packets and/or frames from at least one responder STA. Each DMG beacon frame may be associated with a sector that represents an angled space during a transmission. Based on the sector, a DMG beacon frame may be transmitted in a particular direction associated with that sector. In a sector level sweep, DMG beacon frames may be transmitted in every available direction corresponding to the sectors available at the AP.

At block 404, the initiator device may cause to send the one or more beacon frames directionally using a sector sweep to one or more responder STA (e.g., user devices 120 of FIG. 1) during a first interval. For example, the first interval may be a BTI interval. When the responder STA successfully receives the one or more beacon frames, the responder STA may determine its best RX (TX) sector using the DMG beacon frames transmitted over different antenna sectors from the AP 102. Antenna reciprocity means that a best transmit sector is also the best receiving sector. If a transceiver has TX-RX sector alignment, discovering the best RX sector for the transceiver may mean finding the best TX sector (applicable for both APs and STAs) and selecting the corresponding RX sector. For example, when an STA determines the TX sector of the AP, the STA also determines the best receiving sector of the AP (e.g., using quasi omni mode reception of SSW frames).

At block 406, the initiator device may determine an extended schedule element to be sent to the one or more responder devices, the extended schedule element including one or more directional antenna sectors to be used by the device during a second interval. For example, the AP 102 may schedule resources through the EDMG extended schedule element to present an enhanced SLS beamforming (BF) flow. An EDMG extended schedule element is an element entry in a beacon or an announce frame showing a schedule for a beacon interval. There may be one or more extended schedule element entries conveyed within a beacon or an announce frame.

The AP 102 may use the EDMG extended schedule element, which may include one or more fields to indicate on which sector the AP 102 will be listening during each allocation. The allocation may be either contention-based access period (CBAP) or scheduled service period (SP). An STA may use this information to decide to respond to the AP 102 in the specific directional allocation, which corresponds to the sector identified in the BTI. The AP 102 may configure its RX antenna to a directional mode during DTI and may use the information exchanged in the EDMG extended schedule element to determine the RX sector that the responder STA will be communicating with.

At block 408, the initiator device may identify a first frame from a first responder device, during the second interval, wherein the first frame is received on a directional antenna sector of the one or more directional antenna sectors corresponding to an operating sector of the first responder device. For example, the AP 102 may repeat the sector sweep in the same order as in the BTI but in the RX mode during the DTI. Each responder STA may transmit one frame in the AP 102 sector detected as the best one during the I-TXSS in the BTI. The responder STA's transmission during DTI may be performed in directional mode using the operating sector trained during BTI. In this case, some level of TX-RX EDMG STA reciprocity is assumed. It should be understood that antenna reciprocity means that a best transmit sector may be assumed to be the best receiving sector. When the STA determines its best RX sector, the STA also determines its best TX sector. For example, during BTI, a responder STA may have determined that a certain direction is its best RX sector and due to antenna reciprocity, the responder STA may have determined that the direction is also its best TX sector. During DTI, the responder STA may transmit one or more frames (e.g., SSW, short SSW, etc.) in the direction. In turn, the AP 102 may listen in the direction during DTI. It is understood that the above descriptions are for purposes of illustration and are not meant to be limiting.

Figure 4B:
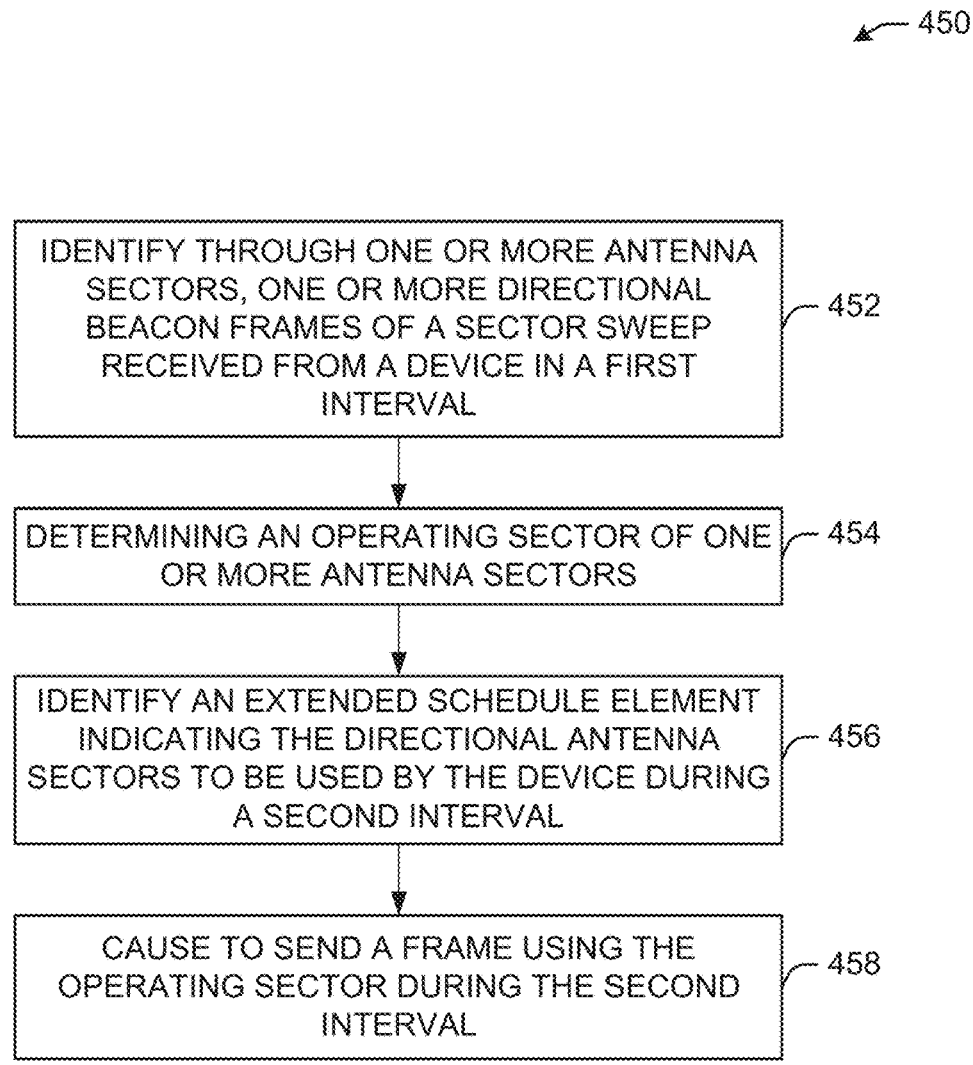
FIG. 4B depicts a flow diagram of an illustrative process for an illustrative MAC range extension system, in accordance with one or more embodiments of the disclosure.

FIG. 4B illustrates a flow diagram of illustrative process 450 for a MAC range extension system, in accordance with one or more example embodiments of the present disclosure.

At block 452, a device (e.g., a responder STA (user device(s) 120 of FIG. 1) and/or the initiator device (AP 102 of FIG. 1)) may identify, through one or more antenna sectors, one or more directional beacon frames of a sector sweep received from a device in a first interval. For example, sector sweep frames transmitted during the regular SLS process allow the AP/PCP to determine its best TX sector, and then due to antenna reciprocity, it knows its best RX sector. The TRN-R fields appended at the end of the beacon frame enable the responder STAs to determine the best RX sectors for the STAs. Then using antenna reciprocity, STAs will also know their best TX sectors. The AP/PCP determines its best TX sector to each STA using the DMG beacon frames transmitted in the I-TXSS process where the PCP/AP sweeps its antenna sectors and sends a DMG Beacon frame in each sector direction.

Each DMG beacon frame may be associated with a sector that represents an angled space during a transmission. Based on the sector, a DMG beacon frame may be transmitted in a particular direction associated with that sector. In a sector level sweep, DMG beacon frames may be transmitted in every available direction corresponding to the sectors available at the AP.

At block 454, the device may determine an operating sector of one or more antenna sectors based at least in part on a comparison between transmission and reception paths of the one or more directional beacon frames. For example, a responder STA may determine the operating sector (e.g., the best RX sector) using DMG beacon frames transmitted over different antenna sectors. Then, based on antenna reciprocity, the responder STA may be able to determine it best TX sector. Antenna reciprocity means that a best transmit sector is also the best receiving sector. If a transceiver has TX-RX sector alignment, discovering the best RX sector for the transceiver may mean finding the best TX sector (applicable for both APs and STAs) and selecting the corresponding RX sector. For example, when an STA determines the TX sector of the AP/PCP, the STA also determines the best receiving sector of the AP 102 (e.g., using quasi omni mode reception of SSW frames).

At block 456, the device may identifying an extended schedule element indicating the directional antenna sectors to be used by the device during a second interval. For example, the AP may schedule the allocation of resources (e.g., timeslots, bandwidth, frequency, channel, etc.) through, for example, an extended schedule element to present an enhanced SLS beamforming (BF) flow. An extended schedule element is an element entry in a beacon or an announce frame showing a schedule for a beacon interval. There may be one or more extended schedule element entries conveyed within a beacon or an announce frame. The AP 102 may modify the EDMG extended schedule element to include one or more fields to indicate on which sector the AP/PCP will be listening during each allocation. The allocation may be either contention-based access period (CBAP) or scheduled service period (SP).

At block 458, the device may cause to send a frame using the operating sector during the second interval. For example, the second sector may be a DTI. An STA may use the information included in the extended schedule element to decide to respond to the AP 102 in the specific directional allocation, which corresponds to the sector identified in the BTI. The AP 102 may configure its RX antenna to a directional mode during DTI and may use the information exchanged in the extended schedule element to determine the RX sector that the responder STA will be communicating with. It is understood that the above descriptions are for purposes of illustration and are not meant to be limiting.

FIG. 5 shows a functional diagram of an exemplary communication station 500 in accordance with some embodiments. In one embodiment, FIG. 5 illustrates a functional block diagram of a communication station that may be suitable for use as an AP 102 (FIG. 1) or user device 120 (FIG. 1) in accordance with some embodiments. The communication station 500 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 500 may include communications circuitry 502 and a transceiver 510 for transmitting and receiving signals to and from other communication stations using one or more antennas 501. The communications circuitry 502 may include circuitry that can operate the physical layer (PHY) communications and/or media access control (MAC) communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry 506 may be configured to perform operations detailed in FIGS. 2, 3, 4A, and 4B.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 500 may include one or more antennas 501. The antennas 501 may include one or more directional or omni mode antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device memory.

FIG. 6 illustrates a block diagram of an example of a machine 600 or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 600 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker), a MAC range extension device 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The MAC range extension device 619 may carry out or perform any of the operations and processes (e.g., processes 400 and 450) described and shown above. For example, the MAC range extension device 619 may include an AP/PCP that may perform a sector level sweep during a BTI interval. The sector level sweep may include transmissions from the AP/PCP in multiple directions. The sector level sweep transmissions may include DMG beacon frames transmitted in multiple directions.

The MAC range extension device 619 may facilitate appending training fields (e.g., TRN-R) to the DMG beacon frames in the sector sweep. These DMG beacon frames may be used to train one or more responder STAs to determine the best sector that the AP/PCP would be listening to in order to receive packets and/or frames from at least one responder STA. Each DMG beacon frame may be associated with a sector that represents an angled space during a transmission. Based on the sector, a DMG beacon frame may be transmitted in a particular direction associated with that sector. In a sector level sweep, DMG beacon frames may be transmitted in every available direction corresponding to the sectors available at the AP.

The AP/PCP may transmit DMG beacon frames over different antenna sectors. The STAs may listen for the SSW frames in quasi-omni mode. In this way, the best TX sector of the AP/PCP 202 may be determined. Due to antenna reciprocity, the best RX sector for AP/PCP 202 may also be determined. On the other hand, the AP/PCP 202 may append training fields (TRN-R) at the end of each beacon frame, and for each training field, an STA may sweep its receiving antenna sectors to determine its best RX sector, then due to antenna reciprocity, STAs also determine their best TX sectors. Antenna reciprocity means that a best transmit sector is also the best receiving sector. If a transceiver has TX-RX sector alignment, discovering the best RX sector for the transceiver may mean finding the best TX sector (applicable for both APs and STAs) and selecting the corresponding RX sector. For example, when an STA determines the TX sector of the AP/PCP, the STA also determines the best receiving sector of the AP/PCP (e.g., using quasi omni mode reception of SSW frames).

The MAC range extension device 619 may facilitate scheduling allocation of resources (e.g., timeslots, bandwidth, frequency, channel, etc.) through the EDMG extended schedule element to present an enhanced SLS beamforming (BF) flow. An EDMG extended schedule element is an element entry in a beacon or an announce frame showing a schedule for a beacon interval. There may be one or more extended schedule element entries conveyed within a beacon or an announce frame.

The MAC range extension device 619 may modify the EDMG extended schedule element to include one or more fields to indicate on which sector the AP/PCP will be listening during each allocation. The allocation may be either contention-based access period (CBAP) or scheduled service period (SP). An STA may use this information to decide to respond to the AP/PCP in the specific directional allocation, which corresponds to the sector identified in the BTI. The AP/PCP may configure its RX antenna to a directional mode during DTI and may use the information exchanged in the EDMG extended schedule element to determine the RX sector that the responder STA will be communicating with.

The MAC range extension device 619 may facilitate polling of responder STAs as an alternative to using the EDMG extended schedule element. In this case, the AP/PCP may send a polling request asking each responder STA to send its best, or otherwise operating TX-RX sector such that the AP is able to listen on that TX-RX sector during DTI. A responder STA may send a probe response to include the responder STA's operating TX-RX sector. This mechanism may be performed in CBAP or SP in DTI.

The MAC range extension device 619 provides an efficient mechanism from the MAC perspective to resolve the asymmetric link problem, without the need to modify the current A-BFT procedures. For example, an advantage may be that the MAC range extension device 619 solves the asymmetric link problem and avoids the use of quasi-omni received at the AP/PCP. Further, the MAC range extension device 619 may provide better integration with current A-BFT, with minimal changes and less complexity. Furthermore, the MAC range extension device 619 may facilitate the reuse of existing channel access.

It is understood that the above are only a subset of what the MAC range extension device 619 may be configured to perform and that other functions included throughout this disclosure may also be performed by the MAC range extension device 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

According to example embodiments of the disclosure, there may be a device. The device may include memory and processing circuitry configured to cause to append a training field to at least one of one or more beacon frames. The memory and processing circuitry may be further configured to cause to send the one or more beacon frames directionally using a sector sweep to one or more responder devices during a first interval. The processing circuitry may be further configured to determine an extended schedule element to be sent to the one or more responder devices, the extended schedule element including one or more directional antenna sectors used by the device during a second interval. The processing circuitry may be further configured to identify a first frame from a first responder device, during the second interval, wherein the first frame is received on a directional antenna sector of the one or more directional antenna sectors corresponding to an operating sector of the first responder device.

The implementations may include one or more of the following features. The training field is used to train the one or more responder devices to determine their respective operating sector during the first interval. The processing circuitry may be further configured to cause to send a first acknowledgment frame to the first responder device, wherein the first acknowledgment frame acknowledges reception of the first frame. The first acknowledgment frame is sent in a direction of the operating sector of the first responder device. The first interval is a beacon transmission interval. The second interval may include directional allocations and quasi-omni allocations. The directional allocations comprise at least one of a contention based period or a scheduled service period. The second interval is a data transmission interval. The device may further include a transceiver configured to transmit and receive wireless signals. The device may further include one or more antennas coupled to the transceiver.

According to example embodiments of the disclosure, there may be a non-transitory computer-readable medium storing computer-executable instructions which, when executed by a processor, cause the processor to perform operations. The operations may include identifying, through one or more antenna sectors, one or more directional beacon frames of a sector sweep received from a device in a first interval. The operations may include determining an operating sector of one or more antenna sectors based at least in part on a comparison between transmission and reception paths of the one or more directional beacon frames. The operations may include identifying an extended schedule element indicating the directional antenna sectors to be used by the device during a second interval. The operations may include causing to send a frame using the operating sector during the second interval.

The implementations may include one or more of the following features. The first interval is a beacon transmission interval. The second interval is a data transmission interval. The second interval may include directional allocations and quasi-omni allocations. The directional allocations comprise at least one of a contention based period or a scheduled service period. The operations further comprise identifying a training field included in at least one of the one or more directional beacon frames. The extended schedule element may include one or more directional allocations by the device.

According to example embodiments of the disclosure, there may be a non-transitory computer-readable medium storing computer-executable instructions which, when executed by a processor, cause the processor to perform operations. The operations may include causing to append, by one or more processors, a training field to at least one of one or more beacon frames. The operations may include causing to send the one or more beacon frames directionally using a sector sweep to one or more responder devices during a first interval. The operations may include determining an extended schedule element to be sent to the one or more responder devices, the extended schedule element including one or more directional antenna sectors used during a second interval. The operations may include identifying a first frame from a first responder device, during the second interval, wherein the first frame is received on a directional antenna sector of the one or more directional antenna sectors corresponding to an operating sector of the first responder device.

The implementations may include one or more of the following features. The training field is used to train the one or more responder devices to determine their respective operating sector during the first interval. The operations may further comprise sending a first acknowledgment frame to the first responder device, wherein the first acknowledgment frame acknowledges reception of the first frame. The first acknowledgment frame is sent in a direction of the operating sector of the first responder device. The first interval is a beacon transmission interval. The second interval may include directional allocations and quasi-omni allocations. The directional allocations comprise at least one of a contention based period or a scheduled service period. The second interval is a data transmission interval.

According to example embodiments of the disclosure, there may include a method. The method may include causing to append, by one or more processors, a training field to at least one of one or more beacon frames. The method may include causing to send the one or more beacon frames directionally using a sector sweep to one or more responder devices during a first interval. The method may include determining an extended schedule element to be sent to the one or more responder devices, the extended schedule element including one or more directional antenna sectors used during a second interval. The method may include identifying a first frame from a first responder device, during the second interval, wherein the first frame is received on a directional antenna sector of the one or more directional antenna sectors corresponding to an operating sector of the first responder device.

The implementations may include one or more of the following features. The training field is used to train the one or more responder devices to determine their respective operating sector during the first interval. The method may further include sending a first acknowledgment frame to the first responder device, wherein the first acknowledgment frame acknowledges reception of the first frame. The first acknowledgment frame is sent in a direction of the operating sector of the first responder device. The first interval is a beacon transmission interval. The second interval includes directional allocations and quasi-omni allocations. The directional allocations comprise at least one of a contention based period or a scheduled service period. The second interval is a data transmission interval.

According to example embodiments of the disclosure, there may include a method. The method may include identifying, through one or more antenna sectors, one or more directional beacon frames of a sector sweep received from a device in a first interval. The method may include determining an operating sector of one or more antenna sectors based at least in part on a comparison between transmission and reception paths of the one or more directional beacon frames. The method may include identifying an extended schedule element indicating the directional antenna sectors to be used by the device during a second interval. The method may include causing to send a frame using the operating sector during the second interval. The first interval is a beacon transmission interval. The second interval is a data transmission interval. The second interval includes directional allocations and quasi-omni allocations. The directional allocations comprise at least one of a contention based period or a scheduled service period. The method may further include identifying a training field included in at least one of the one or more directional beacon frames. The extended schedule element includes one or more directional allocations by the device.

In example embodiments of the disclosure, there may be an apparatus. The apparatus may include causing to append, by one or more processors, a training field to at least one of one or more beacon frames. The apparatus may include causing to send the one or more beacon frames directionally using a sector sweep to one or more responder devices during a first interval. The apparatus may include determining an extended schedule element to be sent to the one or more responder devices, the extended schedule element including one or more directional antenna sectors used during a second interval. The apparatus may include identifying a first frame from a first responder device, during the second interval, wherein the first frame is received on a directional antenna sector of the one or more directional antenna sectors corresponding to an operating sector of the first responder device.

The implementations may include one or more of the following features. The training field is used to train the one or more responder devices to determine their respective operating sector during the first interval. The apparatus may further include means for sending a first acknowledgment frame to the first responder device, wherein the first acknowledgment frame acknowledges reception of the first frame. The first acknowledgment frame is sent in a direction of the operating sector of the first responder device. The first interval is a beacon transmission interval. The second interval includes directional allocations and quasi-omni allocations. The directional allocations comprise at least one of a contention based period or a scheduled service period. The second interval is a data transmission interval.

In example embodiments of the disclosure, there may be an apparatus. The apparatus may include means for identifying, through one or more antenna sectors, one or more directional beacon frames of a sector sweep received from a device in a first interval. The apparatus may further include means for determining an operating sector of one or more antenna sectors based at least in part on a comparison between transmission and reception paths of the one or more directional beacon frames. The apparatus may further include means for identifying an extended schedule element indicating the directional antenna sectors to be used by the device during a second interval. The apparatus may further include means for causing to send a frame using the operating sector during the second interval. The first interval is a beacon transmission interval. The second interval is a data transmission interval. The second interval includes directional allocations and quasi-omni allocations. The directional allocations comprise at least one of a contention based period or a scheduled service period. The apparatus may further include means for identifying a training field included in at least one of the one or more directional beacon frames. The extended schedule element includes one or more directional allocations by the device.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising memory and processing circuitry configured to:
   cause to append a training field to at least one of one or more beacon frames;
   cause to send the one or more beacon frames directionally using a sector sweep to one or more responder devices during a first interval;

determine an extended schedule element to be sent to the one or more responder devices, the extended schedule element including a field indicating one or more directional antenna sectors allocated by the device for receiving communications from the one or more responder devices during a second interval;

identify a first frame from a first responder device, during the second interval, wherein the first frame is received on a directional antenna sector of the one or more directional antenna sectors corresponding to an operating sector of the first responder device; and cause to send a first acknowledgment frame to the first responder device, wherein the first acknowledgment frame acknowledges reception of the first frame.

2. The device of claim 1, wherein the training field is used to train the one or more responder devices to determine their respective operating sector during the first interval.

3. The device of claim 1, wherein the first acknowledgment frame is sent in a direction of the operating sector of the first responder device.

4. The device of claim 1, wherein the first interval is a beacon transmission interval.

5. The device of claim 1, wherein the second interval includes directional allocations and quasi-omni allocations.

6. The device of claim 5, wherein the directional allocations comprise at least one of a contention based period or a scheduled service period.

7. The device of claim 1, wherein the second interval is a data transmission interval.

8. The device of claim 1, further comprising a transceiver configured to transmit and receive wireless signals.

9. The device of claim 8, further comprising one or more antennas coupled to the transceiver.

10. A non-transitory computer-readable medium storing computer-executable instructions which when executed by one or more processors result in performing operations comprising:

identifying, through one or more antenna sectors, one or more directional beacon frames of a sector sweep received from a device in a first interval, wherein at least one of the one or more beacons frame comprises a training field;

determining an operating sector of one or more antenna sectors based at least in part on a comparison between transmission and reception paths of the one or more directional beacon frames;

identifying an extended schedule element including a field indicating the directional antenna sectors to be allocated by the device for receiving communications during a second interval;

causing to send a frame using the directional antenna sectors during the second interval; and identifying a first acknowledgment frame from the device, wherein the first acknowledgment frame acknowledges reception of the frame.

11. The non-transitory computer-readable medium of claim 10, wherein the first interval is a beacon transmission interval.

12. The non-transitory computer-readable medium of claim 10, wherein the second interval is a data transmission interval.

13. The non-transitory computer-readable medium of claim 10, wherein the second interval includes directional allocations and quasi-omni allocations.

14. The non-transitory computer-readable medium of claim 13, wherein the directional allocations comprise at least one of a contention based period or a scheduled service period.

15. The non-transitory computer-readable medium of claim 10, wherein the operations further comprise identifying a training field included in at least one of the one or more directional beacon frames.

16. The non-transitory computer-readable medium of claim 10, wherein the extended schedule element includes one or more directional allocations by the device.

17. A method comprising:

causing to append, by one or more processors, a training field to at least one of one or more beacon frames;

causing to send the one or more beacon frames directionally using a sector sweep to one or more responder devices during a first interval;

determining an extended schedule element to be sent to the one or more responder devices, the extended schedule element including a field indicating one or more directional antenna sectors allocated by the device for receiving communications from the one or more responder devices during a second interval;

identifying a first frame from a first responder device, during the second interval, wherein the first frame is received on a directional antenna sector of the one or more directional antenna sectors corresponding to an operating sector of the first responder device; and sending a first acknowledgment frame to the first responder device, wherein the first acknowledgment frame acknowledges reception of the first frame.

18. The method of claim 17, wherein the training field is used to train the one or more responder devices to determine their respective operating sector during the first interval.

19. The method of claim 17, further comprising sending a first acknowledgment frame to the first responder device, wherein the first acknowledgment frame acknowledges reception of the first frame.

* * * * *